United States Patent [19]
DiResta

[11] Patent Number: 5,844,714
[45] Date of Patent: Dec. 1, 1998

[54] PORTABLE MICROSCOPE

[75] Inventor: James D. DiResta, Woodmere, N.Y.

[73] Assignee: Natural Science Industries, Ltd., West Hempstead, N.Y.

[21] Appl. No.: 791,842

[22] Filed: Jan. 30, 1997

[51] Int. Cl.[6] .......................... G02B 21/24; G02B 21/26; G02B 27/02
[52] U.S. Cl. .......................... 359/368; 359/391; 359/804
[58] Field of Search .................... 359/368, 391, 359/392, 804, 801, 802, 811, 812; D16/131

[56]  References Cited

U.S. PATENT DOCUMENTS

| | | | |
|---|---|---|---|
| 2,533,747 | 12/1950 | Thienemann | 88/39 |
| 2,635,504 | 4/1953 | Hawkins | 88/39 |
| 2,934,993 | 5/1960 | Chromy | 88/14 |
| 3,428,286 | 2/1969 | Del Pesco | 359/811 |
| 4,192,580 | 3/1980 | Meyer | 359/801 |
| 4,737,016 | 4/1988 | Russell et al. | 350/239 |
| 5,052,788 | 10/1991 | Tachibana | 359/368 |

FOREIGN PATENT DOCUMENTS

| | | | |
|---|---|---|---|
| 964850 | 4/1950 | France | 12/2 |
| 665778 | 1/1952 | United Kingdom . | |

*Primary Examiner*—Jon W. Henry
*Attorney, Agent, or Firm*—Schweitzer Cornman Gross & Bondell LLP

[57] ABSTRACT

A portable microscope includes a handgrip-mounted magnifying system and a base to which the handgrip may be removably mounted. An articulating arm is mounted to the base and supports interchangeable specimen holders. Focus of the microscope is accomplished by positioning the arm and mounted specimen holder as required.

4 Claims, 3 Drawing Sheets

PORTABLE MICROSCOPE

The present invention relates to a new and improved portable microscope particularly well suited for use by children.

BACKGROUND OF THE INVENTION

Traditional microscopes include a lens system mounted to a stand or base along with a stage or platform upon which a specimen to be observed is placed. Focus of the lens system upon the specimen is accomplished by varying the distance between the lens system and specimen, typically by use of a gear-type system which adjusts the positioning of the lens system with the specimen remaining fixed. Such microscopes are typically large and heavy devices, impractical for portability and often unsuited for use by children.

It is well recognized that children have an innate curiosity regarding nature. In order to assist in satisfying such curiosity, there is accordingly a need for a compact and rugged microscope-type device which is of simple construction and may be used in a variety of settings.

It is accordingly a purpose of the present invention to provide a compact and lightweight microscope particularly designed for use by children.

It is a further purpose of the present invention to provide a portable microscope which can be used in a variety of settings, including in the field, without the necessity for a working surface or support for the microscope.

It is yet a further purpose of the present invention to provide a microscope which is of simple construction and operation and which provides flexibility of use allowing it to be used to observe a variety of objects which can be mounted in a variety of ways for observation.

BRIEF DESCRIPTION OF THE INVENTION

In accordance with the foregoing and other purposes and objects, a microscope constructed in accordance with the present invention comprises a magnifying lens assembly mounted to a hand grip. The hand grip is removably affixed to a base unit. An articulating arm is mounted to the base, and supports a chosen one of a plurality of interchangeable specimen holders. Focus of the microscope on a particular portion of a specimen mounted in the specimen holder may be accomplished by articulating the arm to place the desired portion of the specimen in focus. The magnifying lens assembly and hand grip may be removed from the base for use as a field magnifier.

BRIEF DESCRIPTION OF THE DRAWINGS

A fuller understanding of the present invention may be achieved upon consideration of the following detailed description of a preferred, but nonetheless illustrative embodiment thereof, when considered in conjunction with the annexed figures, wherein.

DETAILED DESCRIPTION OF THE INVENTION

Figure 2:
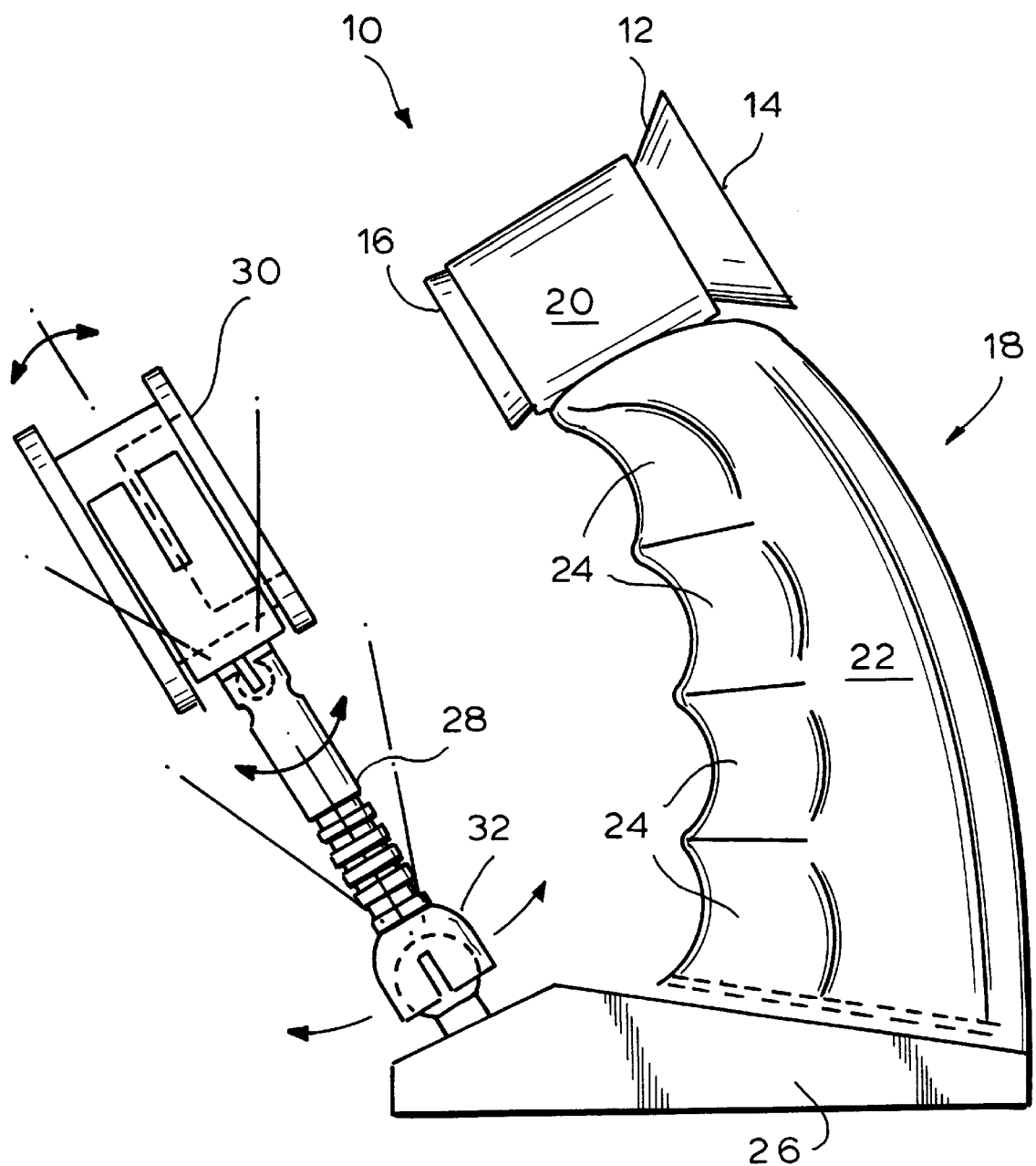
FIG. 2 is a side elevation view thereof.

With initial reference to FIG. 2, the novel microscope 10 of the present invention comprises a magnifying lens assembly 12 which may be in the form of a tubular unit having a first end 14 forming an eyepiece end and an opposed second end 16 defining the objective end of the assembly. Appropriate optical lenses are mounted in the tube as known in the art. The lens assembly 12 is mounted to a handgrip 18, which in turn is mounted to microscope base 26. The upper end 20 of the handgrip preferably includes a throughbore defining a channel to surround and support the lens assembly in the handgrip. The handgrip is further provided with a main contoured portion 22, adapted to be embraced by a hand of the user, and which may be formed with a series of individual finger grip recesses 24 to facilitate the holding thereof.

The handgrip 18 is removably mounted on base 26 which may include a flat lower surface 28 to permit the microscope to stand upright on an appropriate horizontal surface, such as a table. It is to be recognized, however, that the microscope need not be so supported, but can be held without base support. The base 26 also supports arm 28, to the upper end of which is mounted a specimen holder 30. The orientation of the specimen holder 30, and thus an object mounted thereon, with respect to the optical axis of the lens assembly 12 may be adjusted by appropriate positioning of the arm 28 to place the desired portion of the object in focus for the lens assembly.

Figure 1:
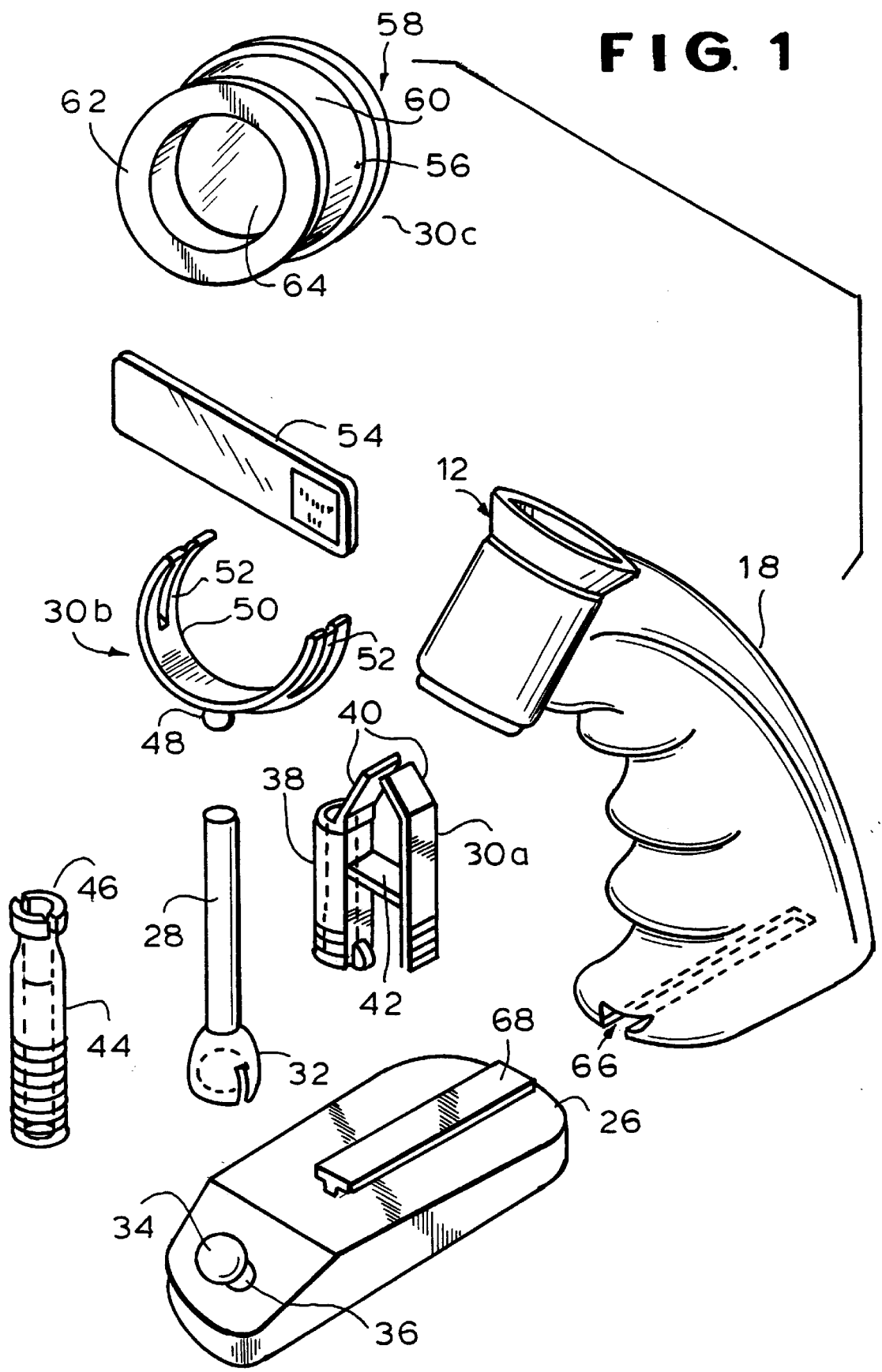
FIG. 1 is an exploded perspective view of a microscope of the present invention.

With further reference to FIG. 1, it may be seen that the arm 28 includes, at its lower end, socket 32 which mates with ball 34 mounted on short pedestal 36 located upon an upper surface of the base 26. A ball and socket joint is thus created, allowing the arm 28 to articulate about the joint, providing a wide range of motion for the arm and attached specimen holder, and allowing for desired positioning of the specimen holder vis-a-vis the lens assembly 12.

Figure 4:
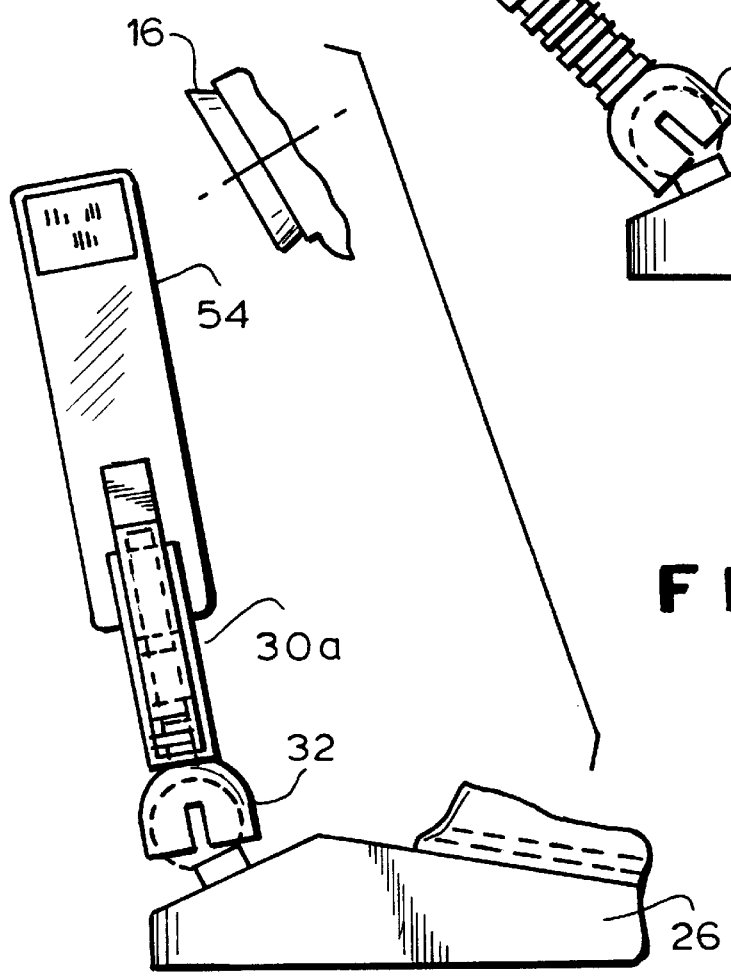
FIG. 4 is a detail view of a second specimen holder mounted on the arm, with the arm in a second orientation for focus.

As further seen in FIG. 1, the microscope may be provided with a plurality of interchangeable specimen holders 30 A, B and C. They may include a pincer-type holder 30A, a combined slide and chamber specimen mount 30B, and a chamber unit 30C. Specimen holder 30A may include tubular mount 38 having an inner diameter chosen to allow a friction fit upon the arm 28, as well as a pair of tweezer-like arms 40 joined together through intermediate flexible bridge element 42. When constructed of an appropriate material, such as plastic or nylon, the bridge element provides resiliency to the positioning of the arms, allowing the arms to be spread apart by applying finger pressure to the lower portions thereof, whereby a specimen may be placed between the inwardly-directed top ends of the arms and held thereby for examination, as depicted in FIG. 4, when the arms return to their normal spacing.

Multiple-use specimen holder 30B is intended to be used in connection with auxiliary mounting arm 44. Auxiliary mounting arm 44 is of generally cylindrical configuration, having an interior bore adapted and dimensioned to allow the auxiliary arm to fit upon arm 28. The top end of the auxiliary arm is formed with a socket 46 which engages the ball 48 of specimen holder 30B. The combination of ball 48 and socket 46 provide a secondary articulating joint for the specimen holder 30B which, in association with the first joint formed by ball 34 and socket 32, provides for further flexibility in positioning the specimen holder 30b and any specimen mounted thereto.

Figure 3:
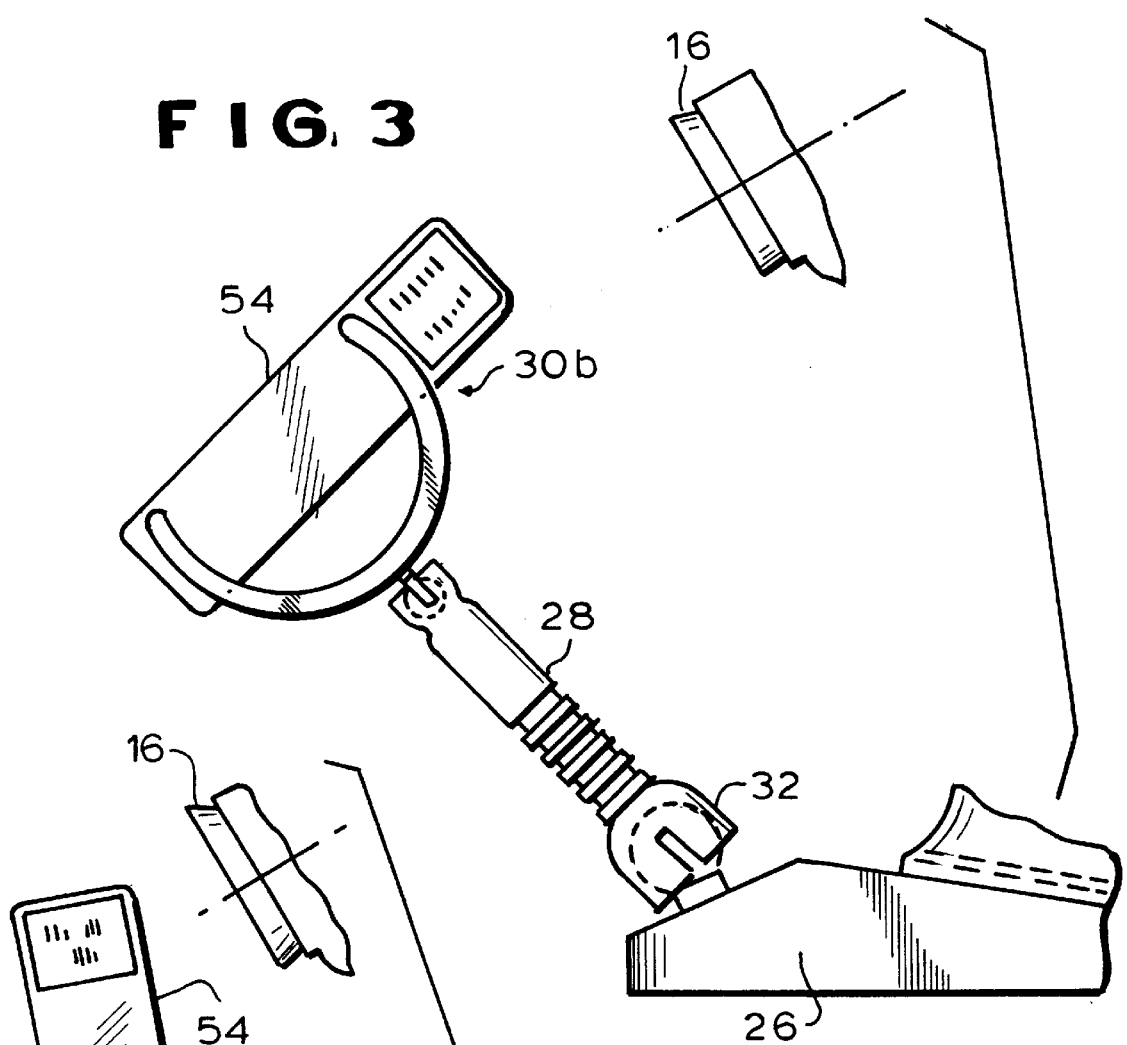
FIG. 3 is a detail view of a first specimen holder of the invention mounted thereon, presenting the arm in a first focus orientation.

Specimen holder 30B may be in the form of a generally semicircular cradle 50, the opposite ends of which are each provided with a longitudinal slot 52. The slots 52 allow insertion of a specimen slide 54, or any similar flat article, as seen in FIG. 3, which then may be positioned for viewing by appropriate positioning of the cradle. The slide 54 is interchangeable within the specimen holder 30B with specimen chamber 30C adapted to allow inspection of liquid or live specimens, or other specimens which are best retained in a closed volume for viewing. In particular, specimen chamber 30C comprises a cup-like container 56, having a clear bottom wall 58 and a cylindrical side wall 60. A top 62, having a clear top wall 64, is provided with a series of exterior threads (not seen) on its side wall which mate with corresponding threads (also not seen) on the interior surface of the cylinder side wall 60. So assembled, the cup and cover form a sealed compartment into which liquid or granular specimens, or liquids bearing specimens to be examined, may be placed for examination. Alternatively, small live specimens, such as insects, ants or the like, may be placed therein for observation.

The diameter of cylindrical side wall 60 is chosen to allow the specimen chamber 56 to be inserted with a snap fit within the arms of the specimen holder 30B. Preferably, the arms describe an arc of somewhat greater than 180 degrees to provide for selective retention of the specimen chamber. So inserted, and as seen in FIG. 2, the microscope can be used to observe liquid or live specimens placed within the chamber.

To provide increased versatility for the microscope, hand grip 18 with the mounted lens assembly 12 is removably mounted to the base 26. As best seen in FIG. 1, the bottom surface of the hand grip 18 is provided with a T-shaped slot 66. A mating T-shaped projection 68 is located on a top surface of the base. Interconnection of the slot and projection mounts the hand grip to the base, while allowing the two elements to be separated when it is desired to use the lens assembly and hand grip separate and apart from the base structure.

I claim:

1. A microscope comprising: a magnifying lens assembly; an elongated hand grip having a first end upon which said lens assembly is affixed, an opposed second end having a track-receiving groove therein and a contoured hand-receiving portion between the first and second ends; a base having a bottom surface for supporting said hand grip in a generally upright position upon a surface and a top surface, said top surface having a track extending therealong to engage said groove and support said handgrip whereby the handgrip may be positioned along said base and removed therefrom; whereby said hand grip and mounted lens may be utilized in alternative configurations with and without said base; an articulating arm mounted to said base; and specimen holder means mounted to said arm.

2. The microscope of claim 1, wherein said specimen holder comprises interchangeable specimen holder elements.

3. The microscope of claim 2, wherein said articulating arm has a socket joint and said base has a mating ball joint.

4. The microscope of claim 1, wherein said magnifying lens assembly is of fixed focus and said arm comprises focus means for the microscope.

* * * * *